Dec. 28, 1954     B. FORD     2,698,217
RECORDING FEED ANALYZER
Filed July 10, 1951     3 Sheets-Sheet 1
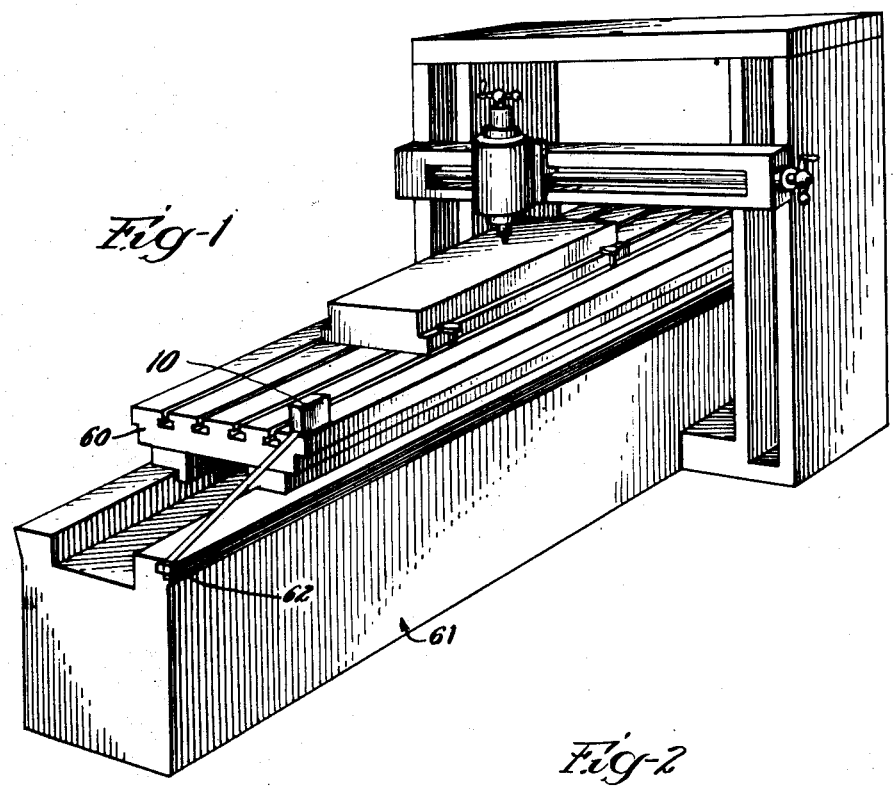
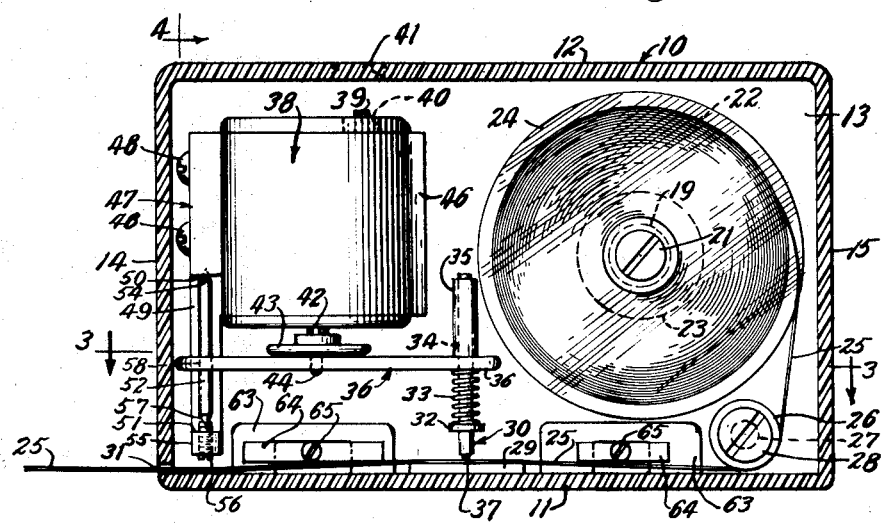
INVENTOR.
Brandt Ford
BY
Robert H. Wendt Dec. 28, 1954           B. FORD           2,698,217
RECORDING FEED ANALYZER
Filed July 10, 1951           3 Sheets-Sheet 2
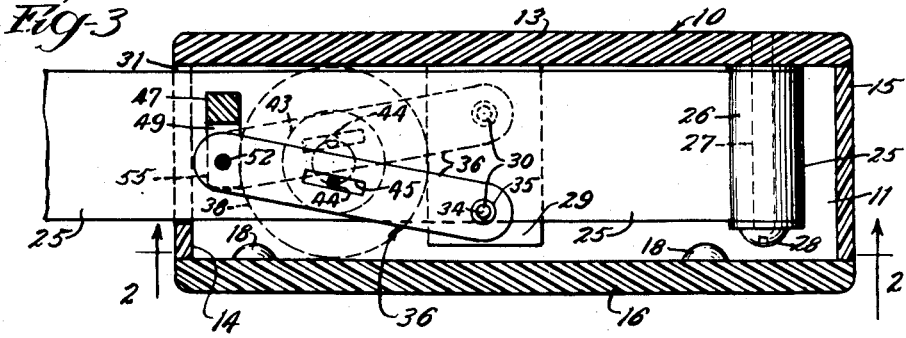
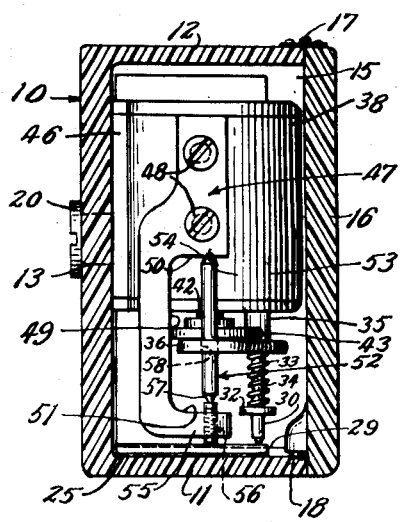
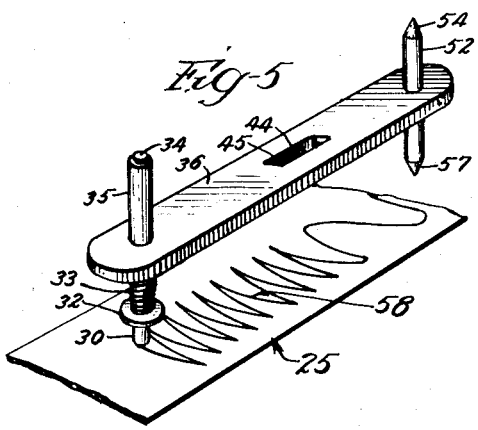
INVENTOR.
Brandt Ford.
BY
Robert H. Wendt
Atty.

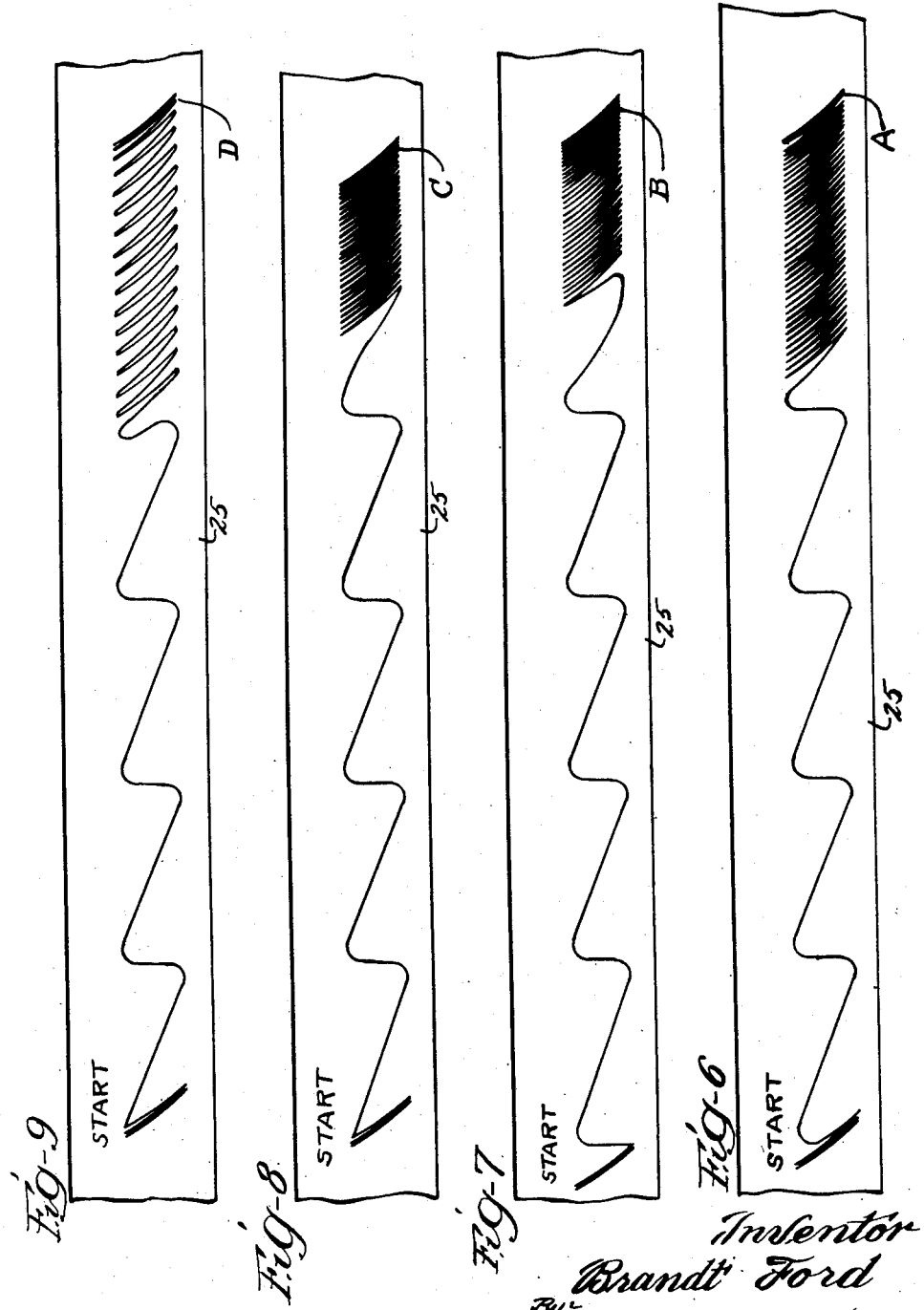

United States Patent Office 2,698,217
Patented Dec. 28, 1954

2,698,217

RECORDING FEED ANALYZER

Brandt Ford, Cedar Falls, Iowa

Application July 10, 1951, Serial No. 235,966

4 Claims. (Cl. 346—33)

The present invention relates to recording feed analyzers and is particularly concerned with the provision of improved devices for producing a continuous record of the feed of various machine tools, particularly in those types where the overall feed may be suitable, but there may be some point in the cycle of feed at which the feed becomes irregular.

One of the objects of the invention is the provision of an improved device for producing a visual and permanent record of the rate of feed of various types of machine tools so that the feed can be measured and its rate determined at any point in the cycle of the feed mechanism.

Another object of the invention is the provision of an improved device for recording and measuring the feed of a machine tool in which the record is produced by a series of wavy lines, which permit the measurement of the rate of feed, and which also quickly reveal any irregularities that indicate uneven, accelerating, or decelerating feed.

Another object of the invention is the provision of an improved feed analyzer which may be used on all kinds of machine tools, and which constitutes a portable unit adaptable to all types of machine tool construction.

Another object of the invention is the provision of an improved feed recorder and analyzer which is simple in construction, compact, durable, capable of being manufactured at a low cost, and which through its indication of irregularities in feed may serve to prevent damage and excessive wear on cutting tools, which might result from irregularities of feed, particularly momentary acceleration of the feed.

Another object is to reduce the money spent on expendable tools by reducing excessive wear upon them, which may result from minor irregularities in the rate of feed, and also to reduce the excessive breakage of expendable tools, which may result from the same factor.

Other objects and advantages of the invention will be apparent from the following description and the accompanying drawings, in which similar characters of reference indicate similar parts throughout the several views.

Referring to the three sheets of drawings accompanying the specification,

Fig. 1 is a view in perspective of a planer type milling machine, shown in connection with my recording feed analyzer;

Fig. 2 is a vertical sectional view, taken through the housing of my feed recorder, immediately adjacent one of the side walls, taken on the plane of the line 2—2 of Fig. 3;

Fig. 3 is a sectional view, taken on the plane of the line 3—3 of Fig. 2, looking in the direction of the arrows;

Fig. 4 is a sectional view, taken on the plane of the line 4—4 of Fig. 2, looking in the direction of the arrows;

Fig. 5 is a fragmentary view in perspective, showing the recording tape and pen with its actuating mechanism;

Fig. 6 is a view showing a copy of a record made on a turret feed, in which there was a marked jump in the turret feed at the end;

Fig. 7 is another record made by my feed recorder, showing that deceleration from the rapid traverse to the feed cycle is regular and constant until deceleration occurs at the peak of the cam rise;

Fig. 8 is another record made of the feed of a machine tool, showing the feed rate is constant and regular until deceleration occurs near the peak of the cam rise;

Fig. 9 is a fourth copy of a feed record made by my recorder, showing irregular deceleration from the rapid transverse to the feed cycle and a marked improvement in cam contour, as noted by the rapid deceleration at the end of the feed cycle.

Referring to Figs. 2–5, the present feed recorder is preferably enclosed in a housing 10 of non-metallic material; and for the purpose of permitting observation of its parts during operation, the housing 10 may be made of transparent plastic, such as "Lucite."

The housing includes a box-like member having a bottom wall 11, top wall 12, rear wall 13, and end walls 14 and 15. The open front is closed by means of a flat cover plate 16 secured to the housing at the top wall 12 by a pair of hinges 17 and held closed by a spring pressed ball latch 18 engaging in a suitable complementary socket in the bottom wall 11.

The rear wall 13 is preferably made heavier than the side walls or top and bottom so that it may provide a support for the parts of the mechanism. At one end the rear wall 13 carries a cylindrical stud 19 secured to the rear wall by means of a threaded screw bolt 20 and provided at its front end with another threaded screw bolt 21 for holding a roll of paper 22 of the type used in adding machines.

The paper roll 22 is mounted upon a wooden core 23, having a bore for receiving the cylindrical stud 19; and the roll is mounted on the stud 19 for rotation, confined by a circular disc 24, which is held in place by screw bolt 21. Thus the device is provided with a supply of paper on a roll which may be drawn from the roll as indicated by the paper strip 25 (Fig. 2).

The device is preferably provided with a suitable guide roller 26 located in the lower right corner of Fig. 2 and rotatably mounted upon a cylindrical stud 27, which has a screw bolt 28 serving as a thrust bearing.

Stud 27 is carried by the rear wall 13 and is so located that the roller 26 holds the paper down close to the bottom wall 11 and at a position below the writing plate 29. The writing plate comprises a smooth, plane member of the same material, which may be welded to the bottom wall 11, and which may be rectangular in shape and located immediately beneath the pen 30.

The housing 10 has its side wall 14 provided with a thin rectangular slot 31 of sufficient length to pass the paper strip 25, and of sufficient width to pass the paper. The slot 31 is located immediately adjacent the bottom wall 11 so that both the roller 26 and the slot 31 tend to pull the paper strip 25 down tightly against the writing plate 29.

The purpose of the writing plate is to provide a smooth backing against which the paper strip may be drawn into a tight, smooth condition to be engaged on its upper side by the pen 30.

The pen 30 preferably comprises a relatively short ball point pen member, which is provided with a radial flange 32 engaged by coil spring 33. The pen is mounted upon a cylindrical shank 34 that slides in a tubular guide 35 carried by an oscillating arm 36. The spring 33 reacts against the arm 36 and acts against the flange 32 to keep the ball 37 of the ball point pen 30 in writing engagement with the paper strip 25 at a suitable pressure.

The arm 36 may be driven by many different types of prime movers, such as an electric synchronous clock motor, which may be connected to the 110 volt 60 cycle lighting circuit to rotate at a constant speed. In the embodiment selected to illustrate the invention the prime mover is a spring wound clock motor 38, which has its winding shaft 39 projecting from an aperture 40 at the top in substantial registry with a key aperture 41 in the top of the housing. Such an electric motor should include a switch for controlling its operation; and a spring motor should include a brake effective to stop the motor.

The spring wound clock motor 38 has suitable gears and balance wheel mechanism so that the shaft 42 rotates at a constant speed. The shaft 42 carries a disc 43, which has a depending eccentrically located pin 44 mounted in an elongated slot 45 in the actuating arm 36.

The clock motor 38 is mounted upon a suitable plate 46 carried by the rear wall 13 and has a pivoted bearing member 47 mounted on the side of the clock motor by means of screw bolts 48. The pivoted bearing member 47 comprises an elongated block of the same material of which the housing is made, provided with a rectangular cut-out at 49, presenting two opposing bearing shoulders 50, 51 (Fig. 4).

These bearing shoulders support the bearings for the spindle 52 of the pen actuating arm 36. For example, the shoulder 50 may have a conical depression 53 for receiving the conical end 54 at the upper end of the spindle.

The lower flange 55 of the bearing member 47 may have a threaded bore for supporting a bearing screw 56, which has a conical socket in its end for receiving the pointed end 57 at the lower end of the spindle 52.

The pen actuating arm 36 may be fixedly secured to the spindle by providing a through bore 58, which has a tight frictional grip on the spindle. Instead of simple conical sockets at 53 and in the bolt 56, suitable jewels may be provided for supporting the spindle 52.

The operation of the mechanism so far described is as follows: When the clock motor 38 is wound by a key applied through the aperture 41, its shaft 42 will be driven at a constant speed determined by the clock mechanism, which will cause the pin 44 to move eccentrically with regard to the axis of shaft 42 in the slot 45.

This causes the pen arm 36 to move back and forth from the full line position of Fig. 3 to the dotted line position and vice versa, with a regular periodic motion, there being a certain number of oscillations per second.

When the paper strip 25 is drawn over the writing plate 29, this produces a wavy line 58 by the action of the oscillating pen 30 on the paper strip 25. When the paper strip is moved in accordance with the feed of a machine tool, this wavy line produces a record of the feed which is correlated to time by means of the oscillating cycle of the pen 30.

The mode of use and operation of the unit is illustrated in Fig. 1, in which 10 indicates the feed recorder unit resting upon the carriage 60 of a planer type milling machine having a base 61 for slidably mounting the carriage 60.

The paper strip 25 is drawn from the unit 10 sufficiently so that its end may be secured to the base at 62 by means of any suitable adhesive or a paper or plastic film bearing a contact adhesive. In most cases the weight of the unit is sufficient to hold it in fixed position upon the carriage 60; but in some embodiments of the invention the bottom 11 may be provided with a plurality of permanent magnets 63 clamped to the rear wall 13 by means of a cross bar 64 and a screw bolt 65, with the poles of the magnet engaging the bottom 11.

Assuming that the carriage 60 is at the beginning of its stroke toward the right in Fig. 1 and the tape is taut and the motor 38 wound and running, as the carriage 60 progresses toward the right the feed of the carriage will be indicated on the paper strip 25 by means of a wavy line 58, which should have its apices equally spaced if the feed is at the same rate throughout the stroke.

Referring to Figs. 6–9, these are reproductions of recordings made on a Potter and Johnson turret lathe having five turret sides. The recordings were made on four of these five sides; and the one not recorded was of such duration of feed that there seemed to be no advantage in recording it.

Figs. 6–9, inclusive, relate, respectively, to the sides 1–4; and any record made should preferably include the part number of the work, the date it was recorded, the operations performed, and the time of the day. The latter becomes important in cold weather, when hydraulic machines may operate sluggishly at certain times of the day.

In these recordings the graphs start at the left hand end of the drawings, where the wavy lines are close together, indicating that the slack in the paper strip is being taken up first. The relatively long waves which follow toward the right indicate the rapid traverse travel of the carriage in each case until it reached the point where the work is to be done.

In Fig. 6 it will be noted that the line spacing produced by the pen is perfectly regular until a point near the right end, where there is such an increase in turret feed that there is a white space. The relatively black line at the right of each graph may indicate that the feed has become extremely slow at this point.

The measurements made on the graph indicate inches in length and number of oscillations, and also the arrows indicate the points at which there are irregularities of feed, such as at A in Fig. 6, B in Fig. 7, C in Fig. 8, and D in Fig. 9.

Ordinarily the average feed would be determined by dividing the inches by the time in minutes or seconds; but there are many occasions when the average feed will not give a true picture of the situation. In order to ascertain the cause of trouble and breakage of tools it is necessary to know that the feed is perfectly uniform throughout the full stroke or to ascertain at what time it is not uniform because that may be the portion of the stroke during which tools are broken.

The present feed record analyzer gives this information and enables the user to locate at once any points of the stroke during which there is irregular feed.

It will thus be observed that I have invented an improved feed recorder which may be used upon all kinds of machine tools for giving an accurate record of the rate of feed at every point of the stroke.

The present recorder is simple, may be manufactured inexpensively, and may be used for a long period of time without necessity for repair; but it may also be the means of preventing breakage on very expensive machine tools by analyzing their feed movements.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a recorder for motor driven tools of the type having a metal cutting tool and a feed mechanism for advancing a work piece toward the cutting tool, the feed determining the depth of cutting, the improvement which comprises a substantially rectangular housing having a top wall, bottom wall, end walls and a side wall of transparent plastic material, one end wall having a thin slot near the bottom wall for passing a paper strip, a fixed stud carried by said side wall for rotatably supporting a roll of paper strip, a plane-surfaced writing table carried by the bottom wall under the paper strip, a guide roller carried by the side wall close to the bottom wall, the roller and said slot holding the paper strip flat on said table, a clock motor carried by said side wall and having a downwardly projecting gear driven rotatable shaft, an eccentric pin carried by said shaft, a lever pivoted on a vertical axis and extending transversely to said pin, said lever having a slot receiving said pin, and a pen carried by said lever and engaging said paper strip above said table, the clock motor reciprocating said lever by means of said eccentric pin to move the pen transversely to the paper at a timed rate, the pen making spaced zigzag lines on the paper as the paper is withdrawn from the roll at the rate of feed of said feed mechanism, the variations in line spacing indicating the variations in feed which might damage the tool or cutter.

2. In a recorder for motor driven tools of the type having a metal cutting tool and a feed mechanism for advancing a work piece toward the cutting tool, the feed determining the depth of cutting, the improvement which comprises a substantially rectangular housing having a top wall, bottom wall, end walls and a side wall of transparent plastic material, one end wall having a thin slot near the bottom wall for passing a paper strip, a fixed stud carried by said side wall for rotatably supporting a roll of paper strip, a plane-surfaced writing table carried by the bottom wall under the paper strip, a guide roller carried by the side wall close to the bottom wall, the roller and said slot holding the paper strip flat on said table, a clock motor carried by said side wall and having a downwardly projecting gear driven rotatable shaft, an eccentric pin carried by said shaft, a lever pivoted on a vertical axis and extending transversely to said pin, said lever having a slot receiving said pin, and a pen carried by said lever and engaging said paper strip above said table, the clock motor reciprocating said lever by means of said eccentric pin to move the pen transversely to the paper at a timed rate, the pen making spaced zigzag lines on the paper as the paper is withdrawn from the roll at the rate of feed of said feed mechanism, the variations in line spacing indicating the variations in feed which might damage the tool or cutter, said lever having a vertical tube carried at its pen end, said pen comprising a ball point pen slidably mounted in said tube and having a thrust flange and a compression spring between said thrust flange and lever, providing a uniform pen pressure at any position of said feed recorder.

3. In a recorder for motor driven tools of the type having a metal cutting tool and a feed mechanism for advancing a work piece toward the cutting tool, the feed determining the depth of cutting, the improvement which comprises a substantially rectangular housing having a top wall, bottom wall, end walls and a side wall of transparent plastic material, one end wall having a thin slot near the bottom wall for passing a paper strip, a fixed stud carried by said side wall for rotatably supporting a roll of paper strip, a plane-surfaced writing table carried by the bottom wall under the paper strip, a guide roller carried by the side wall close to the bottom wall, the roller and said slot holding the paper strip flat on said table, a clock motor carried by said side wall and having a downwardly projecting gear driven rotatable shaft, an eccentric pin carried by said shaft, a lever pivoted on a vertical axis and extending transversely to said pin, said lever having a slot receiving said pin, and a pen carried by said lever and engaging said paper strip above said table, the clock motor reciprocating said lever by means of said eccentric pin to move the pen transversely to the paper at a timed rate, the pen making spaced zigzag lines on the paper as the paper is withdrawn from the roll at the rate of feed of said mechanism, the variations in line spacing indicating the variations in feed which might damage the tool or cutter, and a pair of permanent magnets located on said bottom wall with downwardly turned pole pieces, said magnets holding the recorder fixed on one element of a machine tool while the paper end is adhesively anchored to another relatively moving element.

4. In a recorder for motor driven tools of the type having a metal cutting tool and a feed mechanism for advancing a work piece toward the cutting tool, the feed determining the depth of cutting, the improvement which comprises a substantially rectangular housing having a top wall, bottom wall, end walls and a side wall of transparent plastic material, one end wall having a thin slot near the bottom wall for passing a paper strip, a fixed stud carried by said side wall for rotatably supporting a roll of paper strip, a plane-surfaced writing table carried by the bottom wall under the paper strip, a guide roller carried by the side wall close to the bottom wall, the roller and said slot holding the paper strip flat on said table, a clock motor carried by said side wall and having a downwardly projecting gear driven rotatable shaft, an eccentric pin carried by said shaft, a lever pivoted on a vertical axis and extending transversely to said pin, said lever having a slot receiving said pin, and a pen carried by said lever and engaging said paper strip above said table, the clock motor reciprocating said lever by means of said eccentric pin to move the pen transversely to the paper at a timed rate, the pen making spaced zigzag lines on the paper as the paper is withdrawn from the roll at the rate of feed of said feed mechanism, the variations in line spacing indicating the variations in feed which might damage the tool or cutter, said clock motor comprising a spring-wound clock carrying a bearing bracket having conical bearing sockets and said lever having a pintle with conical bearing ends in said sockets.

References Cited in the file of this patent
UNITED STATES PATENTS

| Number | Name | Date |
| --- | --- | --- |
| 1,453,498 | Hamilton | May 1, 1923 |
| 1,918,388 | Ferguson | July 18, 1933 |
| 2,029,771 | Gray | Feb. 4, 1936 |
| 2,287,819 | Nichols | June 30, 1942 |
| 2,330,752 | Sikes, Jr. | Sept. 28, 1943 |

FOREIGN PATENTS

| Number | Country | Date |
| --- | --- | --- |
| 330,804 | Great Britain | June 19, 1930 |